US012657268B2

(12) United States Patent
Telford-Reed et al.

(10) Patent No.: US 12,657,268 B2
(45) Date of Patent: Jun. 16, 2026

(54) SYSTEMS AND METHODS FOR EXECUTING ELECTRONIC TRANSACTIONS USING BIOMETRIC DATA

(71) Applicant: Worldpay Limited, London (GB)

(72) Inventors: Nicholas Telford-Reed, Bassingbourn (GB); Jonathan Vokes, London (GB)

(73) Assignee: Worldpay Limited, London (GB)

( * ) Notice: Subject to any disclaimer, the term of this patent is extended or adjusted under 35 U.S.C. 154(b) by 248 days.

(21) Appl. No.: 17/206,502

(22) Filed: Mar. 19, 2021

(65) Prior Publication Data

US 2021/0224370 A1    Jul. 22, 2021

Related U.S. Application Data

(63) Continuation of application No. 15/735,159, filed as application No. PCT/GB2016/052211 on Jul. 21, 2016, now Pat. No. 11,062,002.

(30) Foreign Application Priority Data

Jul. 22, 2015    (GB) ..................................... 1512885

(51) Int. Cl.
*G06F 21/32*          (2013.01)
*G06Q 20/40*          (2012.01)
(Continued)

(52) U.S. Cl.
CPC ....... *G06F 21/32* (2013.01); *G06Q 20/40145* (2013.01); *H04L 63/0861* (2013.01); *H04W 12/126* (2021.01)

(58) Field of Classification Search
None
See application file for complete search history.

(56) References Cited

U.S. PATENT DOCUMENTS 6,726,094 B1    4/2004    Rantze et al.
8,494,961 B1    7/2013    Lucas et al.
(Continued)

FOREIGN PATENT DOCUMENTS

CN          202771446 U    †    3/2013
CN          104301295 A    †    1/2015
(Continued)

OTHER PUBLICATIONS

Foreign Communication from a Related Counterpart Application, International Search Report and Written Opinion dated Oct. 20, 2016, International Application PCT/GB2016/052211 filed on Jul. 21, 2016.

(Continued)

*Primary Examiner* — David P Sharvin
(74) *Attorney, Agent, or Firm* — Bookoff McAndrews, PLLC

(57)          ABSTRACT

The invention relates generally to secure data entry devices and methods of using such devices. A secure data entry device is provided that includes an integrated imaging device arranged such that it captures at least one image of a user during a transaction. The at least one image is processed in order to generate a biometric pattern. In one embodiment the at least one image includes a user's face and the processing involves applying a facial recognition algorithm to the at least one image to generate the biometric pattern. In some embodiments the biometric pattern is compared to a trusted biometric pattern in order to determine whether to approve or decline the transaction.

20 Claims, 5 Drawing Sheets

(51) Int. Cl.
_H04L 9/40_ (2022.01)
_H04W 12/126_ (2021.01)

(56) References Cited

U.S. PATENT DOCUMENTS

| | | | |
|---|---|---|---|
| 9,202,099 | B2 | 12/2015 | Han et al. |
| 2002/0191816 | A1 | 12/2002 | Maritzen et al. |
| 2005/0188213 | A1* | 8/2005 | Xu ..................... G06V 40/1365 |
| | | | 713/186 |
| 2007/0132874 | A1* | 6/2007 | Forman ................ H04N 23/743 |
| | | | 348/E5.045 |
| 2007/0220044 | A1† | 9/2007 | Marugame |
| 2009/0175509 | A1 | 7/2009 | Gonion et al. |
| 2009/0268939 | A1 | 10/2009 | Connell, II et al. |
| 2010/0205667 | A1 | 8/2010 | Anderson et al. |
| 2012/0030474 | A1* | 2/2012 | Sayler ..................... G06F 21/32 |
| | | | 713/186 |
| 2012/0140994 | A1 | 6/2012 | Yamada |
| 2013/0015946 | A1 | 1/2013 | Lau et al. |
| 2013/0147603 | A1* | 6/2013 | Malhas .................. G06V 40/18 |
| | | | 340/5.83 |
| 2014/0270404 | A1* | 9/2014 | Hanna .................... G06V 40/45 |
| | | | 382/116 |
| 2014/0283113 | A1 | 9/2014 | Hanna |
| 2015/0046257 | A1 | 2/2015 | Tabor et al. |
| 2015/0046328 | A1 | 2/2015 | Mitra |
| 2015/0347734 | A1* | 12/2015 | Beigi .................... H04L 9/3268 |
| | | | 726/28 |
| 2015/0363749 | A1 | 12/2015 | Buscher et al. |
| 2016/0063235 | A1* | 3/2016 | Tussy ................. G06Q 20/3276 |
| | | | 726/6 |
| 2017/0004472 | A1 | 1/2017 | Tkachenko et al. |
| 2021/0144009 | A1* | 5/2021 | Dinkelmann .......... G06V 10/25 |

FOREIGN PATENT DOCUMENTS

| | | | |
|---|---|---|---|
| GB | 2501322 | A | 10/2013 |
| GB | 2517562 | A | 2/2015 |
| JP | 2007280173 | A | 10/2007 |
| WO | 9809227 | A1 | 3/1998 |
| WO | 0042577 | A1 | 7/2000 |
| WO | 0045247 | A1 | 8/2000 |
| WO | 0201314 | A2 | 1/2002 |
| WO | WO2017013434 | A1 | 1/2017 |

OTHER PUBLICATIONS

Foreign Communication from a Related Counterpart Application, European Examination Report dated Dec. 15, 2015 GB Application No. GB1512885.3.

Extended European search report in corresponding European Application No. 16744478.5, dated Apr. 20, 2020 (4 pages).

Allaf, Omainma "Review of Face Detection Systems Based Artificial Neural Networks Algorithms", Feb. 2014, The int. Journal of Multimedia & Its Applications (IJMA) vol. 6, No. 1 (Year: 2014).

UK Abbreviated Examination Report issued on Jan. 27, 2022 in counterpart UK Application No. GB2200438.6 (4 pages, in English).

\* cited by examiner
† cited by third party

SYSTEMS AND METHODS FOR EXECUTING ELECTRONIC TRANSACTIONS USING BIOMETRIC DATA

CROSS-REFERENCE TO RELATED APPLICATION(S)

This patent application is a continuation of and claims the benefit of priority to U.S. application Ser. No. 15/735,159, filed Dec. 8, 2017, which claims priority to Great Britain Application No. GB 1512885.3 filed with the Intellectual Property Office of Great Britain on Jul. 22, 2015, both of which are incorporated herein by reference in their entirety for all purposes.

FIELD OF INVENTION

This invention relates generally to secure data entry devices, and more specifically to secure data entry devices having an integrated imaging device and methods of using such secure data entry devices.

BACKGROUND

Increasing numbers of financial transactions today take the form of a card transaction, in which a customer presents a payment card at a point of sale in order to pay for goods and/or services. Exemplary payment cards include e.g. credit cards, debit cards and pre-paid service cards, which may take the form of so-called 'smart cards' making use of the 'EMV' payment standard. Virtual payment cards that are entirely electronic in nature are also increasingly being used. Virtual payment cards are typically stored on a smartphone or other such portable electronic device, possibly by means of a payment token. Collectively, such payment mechanisms are referred to in the art as 'payment instruments'.

A payment card includes details specific to a given user; for example, the name of the user, and a unique number identifying the user (e.g. PAN) are typically printed on the payment card, or stored on a smartphone or the like in the case of a virtual payment card. The payment card also includes one or more mechanisms for storing data electronically, and a corresponding data interface mechanism for each storage mechanism. One well known data storage mechanism is a magnetic stripe ('magstripe'). Another well-known data storage mechanism is an integrated circuit, which is sometimes referred to in the art as a 'chip'. In these cases, a payment is enacted by bringing the magnetic stripe or chip into contact with an appropriately configured interface of a secure data entry device such as a personal identification number entry device ('PED') to allow the data stored on the card to be read by the secure data entry device. Most modern payment cards are also provided with a Near Field Communication (NFC) controller coupled to an antenna to allow so-called 'contactless' payment, where the antenna is brought sufficiently close to the secure data entry device to allow radio frequency communication between the card and device to facilitate payment. In the case of a virtual payment card, the electronic device that the card is stored on is provided with an interface that enables it to communicate with a secure data entry device.

A core part of a card transaction is cardholder identity verification, which serves to prevent fraudulent use of a payment card by an unauthorised party. Cardholder identity verification typically involves a user being required to enter a secure piece of information into the secure data entry device during the payment process. A commonly used secure piece of information is a numeric password, often referred to as a personal identification number ('PIN'), although other systems that make use of biometric data such as a fingerprint or a signature are also possible. The entered information is compared to corresponding stored information that is associated with the payment card, where the transaction is authorised only if the entered secure information matches the stored secure information associated with the payment card taking part in the transaction. In theory the secure information is known only by the authorised user, or in the case of biometric data is only available to the authorised user, hence an unauthorised user should not be able to pass this identity check. The secure data can therefore in theory be used to confirm that the authorised user was present when the payment card was used and that therefore the transaction is not fraudulent.

A problem with existing identification checks is that it is possible for an unauthorised person to gain access to secure data, e.g. by observing the authorised user entering their PIN, or by spoofing a fingerprint. In this case the payment system will be fooled into thinking the authorised user was present at the point of sale terminal and will hence authorise the transaction.

Another problem with existing identification checks is that the data associated with the transaction that is being recorded is typically that associated with the payment card taking part in the transaction. Data relating to an unauthorised user is not consistently captured. It would be useful for e.g. law enforcement agencies to be able to review data relating to the person who attempted a fraudulent transaction, in addition to data relating to the payment card that was used.

A further problem with existing identity checks is that an authorised user may accidentally enter secure information incorrectly, which may lead to an inconvenience for the authorised user such as the transaction being declined and/or their payment card being temporarily disabled. It would therefore be useful to be able to distinguish between instances where an authorised user has accidentally entered incorrect information as opposed to instances where an unauthorised user has entered incorrect information in a failed attempt to commit fraud.

Some progress in this area has been made. However, some problems remain outstanding even in view of this progress. Currently, transactions involving payment instruments such as credit and debit cards are quick and easy for a user to perform. Users will therefore be likely to react unfavourably to modifications to payment instrument transaction processes that make the transaction more difficult to perform, and/or which slow the transaction process down. In particular users will be unlikely to want to have to actively participate in the biometric data acquisition process, such as having to position their face in a particular target region whilst an image is captured. However, it can be difficult to gather biometric data in a manner that is reliable, repeatable and secure without active user participation.

SUMMARY OF THE INVENTION

In a first aspect, the invention provides a secure data entry device, comprising: a housing; a display; at least one user input means; at least one imaging means; a data processing device; at least one payment instrument reading means; and a network interface; wherein the at least one imaging means is configured to capture a plurality of images of a user during a transaction involving a payment instrument; and wherein the data processing device is configured to: assign a usability score to each image of the plurality of images; select at least one selected image from the plurality of images based on the usability score of each image; and process the at least one selected image to generate a biometric pattern corresponding to the user.

In a second aspect, the invention provides a system, comprising: a secure data entry device comprising a housing, a display, at least one user input means, at least one imaging means, a data processing device, at least one payment instrument reading means and a network interface; and a point of sale terminal comprising an image processing module; wherein the at least one imaging means is configured to capture a plurality of images of a user during a transaction involving a payment instrument; wherein the secure data entry device is configured to cause the plurality of images to be transmitted to the point of sale terminal; and wherein the image processing module is configured to: receive the plurality of images; assign a usability score to each image of the plurality of images; select at least one selected image from the plurality of images based on the usability score of each image and process the at least one selected image to generate a biometric pattern corresponding to the user.

In a third aspect, the invention provides a method, comprising: initiating a payment transaction, the payment transaction involving a payment instrument; capturing, using an imaging means, a plurality of images of a user during the payment process, the imaging means being part of a secure data entry device; assigning, using a processor, a usability score to each image of the plurality of images; selecting, using the processor, at least one selected image from the plurality of images based on the usability score of each image; processing, using the processor, the at least one selected image to generate a biometric pattern; and storing the biometric pattern in a database.

In a fourth aspect the invention provides a method, comprising: i) receiving a first biometric pattern associated with a given use of a payment instrument; ii) identifying, using a processor, at least one existing biometric pattern that is associated with one or more previous uses of the payment instrument; iii) determining, using the processor, an average of the at least one existing biometric pattern and the first biometric pattern; and iv) storing the averaged biometric pattern. The method may optionally also comprise v) determining, using the processor, whether a confidence level associated with the averaged biometric pattern is greater than or equal to a threshold value; and, in the affirmative, flagging the stored averaged biometric pattern as a trusted biometric pattern.

In a fifth aspect the invention provides a server configured to: i) receive a first biometric pattern associated with a given use of a payment instrument; ii) identify at least one existing biometric pattern that is associated with one or more previous uses of the payment instrument; iii) determine an average of the at least one existing biometric pattern and the first biometric pattern; and iv) store the averaged biometric pattern. Optionally, the server is further configured to: v) determine whether a confidence level associated with the averaged biometric pattern is greater than or equal to a threshold value; and, in the affirmative, flag the stored averaged biometric pattern as a trusted biometric pattern.

Further preferred embodiments are set out in the appended dependent claims.

BRIEF DESCRIPTION OF THE DRAWINGS

Embodiments of the present invention are now described, by way of example only, with reference to the accompanying drawings, in which.

DETAILED DESCRIPTION OF EMBODIMENTS

Figure 1:
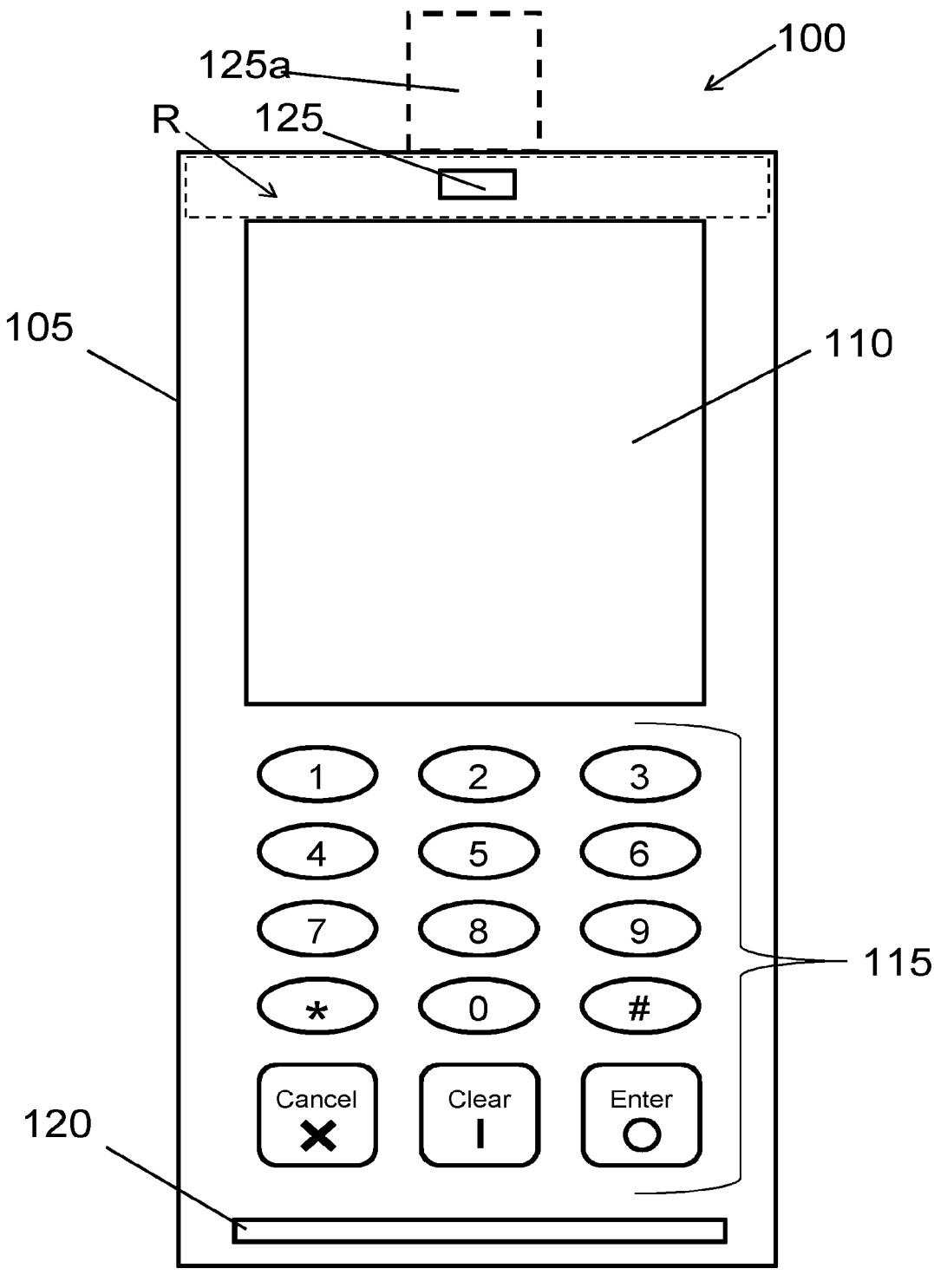
FIG. 1 is a schematic diagram of a secure data entry device according to an embodiment.

FIG. 1 shows a secure data entry device 100 according to an embodiment. In this embodiment, secure data entry device 100 is 'secure' in the sense that it meets the security standards that are set for a device that is to accept secure data, as established in the relevant industry. For example, in the case where the secure data is a Personal Identification Number (PIN), secure data entry device 100 may include means that allows it to meet the requirements of the PCI-PTS and PCI-PIN standards established in the electronic payment industry. It will be appreciated by the skilled reader that such standards change from time to time and further that new standards which supersede old standards are occasionally introduced.

Secure data entry device 100 includes a housing 105 that is typically made of a plastic or metal (in the case of an unattended data entry self-service machine), although the invention is not limited in this respect. Secure data entry device 100 may also include a display 110 for communicating information such as an amount due for payment to a user. Display 110 may be a touch screen of the type known in the art. Display 110 is embedded in a recess in housing 105 such that a user can view display 110 from the exterior of secure data entry device 100. It will be appreciated that forms of display other than a screen may be provided. In another embodiment, the display includes one or more indicators such as light emitting diodes (LEDs) that can indicate progress and status of a transaction to the user in addition to or instead of a screen.

Housing 105 includes a front surface and a rear surface. In the following, the front surface of housing 105 refers to the surface of housing 105 through which display 110 is visible. The rear surface of housing 105 is the surface that is opposite the front surface. Housing 105 also includes at least one perimeter surface, which in the following is understood to mean the surface(s) of housing 105 that connect the front surface with the rear surface. In the illustrated embodiment housing 105 is approximately cuboidal and hence four perimeter surfaces are present. The invention is not limited in this respect; the shape of housing 105 can be varied as desired to suit the requirements of a given situation.

The top of secure data entry device 100 is understood to be the edge of the secure data entry device that is furthest from a user when the secure data entry device is aligned with respect to the user such that information displayed on display 110 is correctly oriented for the user to read. The bottom and sides of secure data entry device 100 are defined relative to the top in the usual manner.

Secure data entry device 100 further includes at least one user input means 115 that in the illustrated embodiment takes the form of a keypad having one or more buttons. Other user input means known to the skilled person may additionally or alternatively be provided, such as a touch-screen and/or a fingerprint scanner. In the event that display 110 is a touchscreen, this may double as the user input means. The input means is located in an input means area, which is a portion of the front surface of secure data entry device 100 that contains the input means.

User input means 115 functions to, among other things, allow the user to enter secure data into secure data entry device 100. In one embodiment user input means 115 is a keypad and the secure data is a Personal Identification Number ('PIN') of the type well known in the art. In this case secure data entry device 100 may be referred to as a PIN Entry Device ('PED'), which is a term of art. In another embodiment the secure data is a fingerprint or other such biometric data.

Secure data entry device 100 additionally includes one or more payment instrument reading means (not shown) for reading a payment card or a virtual payment card. In the following, payment cards and virtual payment cards are sometimes collectively referred to as payment instruments, which is a term of art. This term may also encompass other devices that provide similar functionality to a payment card, for example a key fob.

The payment instrument reading means can be any combination of suitable means known in the art, such as a magnetic stripe reader, an integrated circuit reader and/or a Near Field Communication (NFC) antenna. In the illustrated embodiment secure data entry device 100 includes at least an integrated circuit reader, and hence a slot 120 is provided in housing 105 to allow a payment card to be inserted into housing 105 to provide contact between the integrated circuit in the payment card and the integrated circuit reader. It will be appreciated that slot 120 is not always required; for example, it could be omitted in the case where NFC and/or magnetic stripe technology is employed. In some embodiments the payment instrument reading means is configured to read virtual payment cards as well as physical payment cards.

Figure 2:
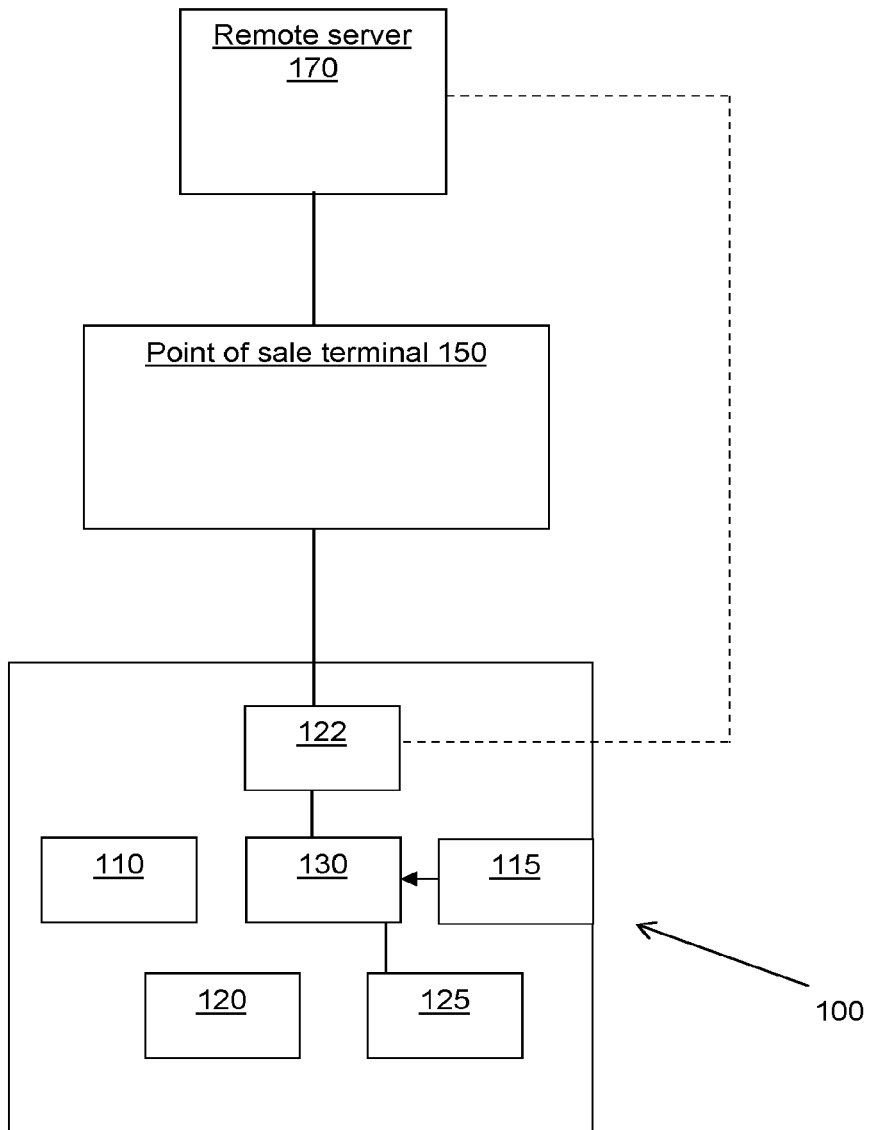
FIG. 2 is a block diagram showing a system comprising the secure data entry device of FIG. 1.

Secure data entry device 100 also includes a network interface 122 (see FIG. 2). The network interface 122 is configured to communicate over a network with one or more external devices. The network interface 122 can also communicate via other machines, typically a point of sale computer running the stock and order management. Alternatively, another machine such as an unattended data entry self-service machine may be communicated with by the secure data entry device 100. Such a machine could be a self-service kiosk where a customer may pay for goods and services without a merchant employee at the kiosk at all times. The secure data entry device 100 could be connected in a semi-permanent position adjacent to the self-service machine. The network interface can be any suitable wired or wireless network interface known in the art. As shown in FIG. 2, the one or more external devices can be one or more of a point of sale terminal 150 and a remote server 170. The remote server may be associated with a card acquirer which processes payment instrument transactions. Here, 'remote' indicates that the server is physically distinct from secure data entry device 100. In some embodiments remote server 170 is at a different physical location to secure data entry device 100. In other embodiments, remote server 170 and secure data entry device 100 are at the same physical location, but are physically distinct from one another.

In a typical arrangement as shown in FIG. 2, secure data entry device 100 communicates with a point of sale terminal 150 via the network interface 122, with the point of sale terminal 150 communicating with the remote server 170 to handle the transaction. However, in an alternative embodiment secure data entry device 100 operates in a 'standalone' mode where secure data entry device 100 is not in communication with a point of sale terminal but instead communicates directly with the remote server via the network interface. This is shown by the dashed line in FIG. 2. In this alternative embodiment the point of sale terminal 150 may be omitted entirely, if desired. Communication between remote server 170, point of sale terminal 150 and/or secure data entry device 100 can be supported by a public network such as the Internet, or a private network, or a combination of a public and private network. The invention is however not limited in this respect and alternative configurations will be readily conceived by a skilled person having the benefit of the present disclosure.

Returning to FIG. 1, secure data entry device 100 also includes an imaging means 125 that is able to detect electromagnetic radiation and in this embodiment this is in at least a portion of the visible region. In the illustrated embodiment imaging means 125 is a camera, preferably a digital camera. The invention is not limited in this respect and other imaging means known to the skilled person may alternatively be used. For example, a camera may be provided to detect radiation in a non-visible region of the electromagnetic spectrum such as infra-red or ultra violet and this used in place of visible imagery.

Imaging means 125 has a field of view, which is understood to be the solid angle over which imaging means 125 can detect electromagnetic radiation. The field of view has a primary axis, which is understood to be the axis that extends through the central point of the aforementioned solid angle and is perpendicular to the plane of the solid angle at that central point.

The location of imaging means 125 with respect to housing 105 is selected such that the field of view of imaging means 125 is centered on the location at which it is expected that a target area of a user will reside during normal use of secure data entry device 100, and preferably during entry of the secure data. The purpose of this alignment is to maximise the chance that a complete image of the target area of the user will be captured by imaging means 125 during entry of the secure data. In a preferred embodiment, the target area of the user is the user's face. However, the invention is not limited in this respect and in other embodiments the target area of the user is one or more of the user's fingers, the user's thumb, the user's palm and the user's eye; specifically, the iris. Other suitable target areas will be determined by the skilled person. The general principle to apply when selecting a target area is that the selected target area should be sufficiently unique to prevent both false negatives and false positives when matching biometric data derived from the target area with stored biometric data and to maximise the opportunity to provide true negative and positive matches.

Normal use of secure data entry device 100 includes, among other things, paying for goods and/or services using a payment card or a virtual payment card. The payment process may involve entering a PIN using a keypad, bringing a payment instrument such as a contactless payment card or an electronic device on which a virtual payment card is stored close to secure data entry device 100 to facilitate payment, and/or entering biometric information by e.g. placing a finger on a fingerprint scanner or signing the display screen (110) with a stylus or finger.

Imaging means 125 is preferably configured such that it is focused at the distance at which it is expected that the target area of the user will reside during normal use of the secure data entry device. In the case where the target area is the user's face, imaging means 125 is preferably focused at the distance where the user's face is expected to be positioned during normal use of the secure data entry device. This contributes towards sharp images being taken by the imaging means. In some embodiments the focus of imaging means 125 can be adjusted dynamically, so as to provide an autofocus capability as is known in the art of imaging devices.

Additionally, the location of imaging means 125 is preferably chosen such that the chance of the field of view of the imaging means being partially or fully obscured during normal use of the secure data entry device is minimised. For example, in the case where a contactless payment is being made, imaging means 125 is preferably located sufficiently far from the area of secure data entry device 100 that the user is directed to bring their payment instrument close to such that it is unlikely that the user's payment instrument will obscure imaging means 125 when the payment instrument is brought close to secure data entry device 100 to facilitate payment. In the case of a keypad PIN entry or a fingerprint scan, imaging means 125 is preferably located such that the user's hand is unlikely to partially or fully obscure the field of view of the imaging means while the user provides the required secure data, i.e. their PIN or their fingerprint.

In a preferred embodiment, imaging means 125 is mounted in the front surface of secure data entry device 100 above the display 110 and proximal to a top edge of the housing of the device 100. Preferably, imaging means 125 is mounted flush to the front surface of secure data entry device 100, such that it does not protrude outwardly beyond the plane of the front surface of secure data entry device 100. Preferably, in this embodiment imaging means 125 is located at a point that is between the top edge of secure data entry device 100 and display 110. This preferred region shown as a dashed box labelled 'R' in FIG. 1. This location also allows imaging means 125 to effectively capture a usable image of a user's face during normal use of secure data entry device 100. It will however be appreciated that the invention is not limited to the above-described locations for imaging means 125 and that other suitable locations for imaging means 125 will be apparent to the skilled reader having the benefit of the present disclosure.

Alternatively, if it is impractical or undesirable for any reason to mount imaging means 125 in the housing of the secure data entry device 100, imaging means 125*a* can instead be fixed to the housing 105 of the data entry device 100. This is also shown in FIG. 1, in which imaging means 125*a* is mounted to a perimeter surface of secure data entry device 100; specifically, the top surface of secure data entry device 100.

Regardless of whether imaging means 125 is mounted in region R or on a surface of secure data entry device 100, preferably the field of view of imaging means 125 is centered along an axis that is perpendicular to the plane of the front surface of secure data entry device 100. This allows imaging means 125 to capture a complete image of a user's face during PIN entry and/or contactless payment. In the illustrated embodiment secure data entry device 100 is a VeriFone® VX 820 Card Secure PIN entry device as available from VeriFone® UK Limited. The imaging means can be mounted to a perimeter surface of the particular PIN entry device in this embodiment. It will however be appreciated that the invention is not limited in this respect and that that any other secure data entry device known to a skilled person may instead be used for secure data entry device 100. Such secure data entry devices are portable to enable a user to move it with ease if required.

Specifically, the above-described locations for imaging means 125 are provided as preferred examples, but it will be appreciated that the invention is not limited in this respect. In other embodiments, the imaging means may be positioned elsewhere on the front surface of housing 105 and may be discrete and integrated in housing 105, provided that the optical axis of imaging means 125 extends substantially perpendicular or angled appropriately to the front surface of the secure data entry device on which the user input means is positioned. The image of the user of the device can therefore be captured when the user is interacting with the user input means when required.

In a further alternative embodiment, imaging means 125 is mounted to the bottom surface of secure data entry device 100. In yet another embodiment, imaging means 125 is mounted to one of the sides of secure data entry device 100.

Whatever the location of imaging means 125, it will be appreciated that in all embodiments the field of view of imaging means 125 is directed towards the position at which the target area of the user is expected to be located during normal use of secure data entry device 100.

Advantageously, locating imaging means 125 as described above does not require the user to actively participate in the image gathering process. Specifically, the user does not need to be directed by secure data entry device 100 or any other means (e.g. a merchant) to align the target area of the user, e.g. their face or hand, precisely in the field of view of the imaging means, or to remain still while an image is being captured, etc. This is because the user will necessarily look at the input means (e.g. keypad) and/or display 110 and/or bring their hand proximate imaging means 125 during normal use of secure data entry device 100, and in particular whilst the user enters their secure data. This allows a clear image of the target area of the user (face, digits, palm, eye, etc.) to be obtained. The above-described locations of imaging means 125 exploit this fact to maximise the chance that a usable image of the user is captured during normal use of secure data entry device 100, without inconveniencing the user during the process.

As mentioned above, the housing of the data entry device may be part of an unattended data entry self-service machine such as a self-service kiosk (not shown) where a customer may pay for goods and services without a merchant employee at the kiosk at all times. In such a machine, as known to those skilled in the art, there may be items such as a display, user input means such as a PIN entry pad, and a slot for receiving a payment instrument from a user to pay for goods or services. In addition, the device will be provided with an imaging means 125 as described above. The imaging means 125 will be appropriately located on the front surface of the data entry device or at other positions as described herein.

Another advantage of embodiments described herein is that the normal payment process that a user is accustomed to is not modified, nor is the duration of the payment process extended significantly. This is important as users are accustomed to current payment processes involving payment instruments which typically take only a few seconds.

As is known in the art, a transaction involving a secure data entry device typically generates an associated transaction receipt. This is often in the form of a paper receipt, although it could be an electronic receipt (e.g. an email receipt). In preferred embodiments, in addition to the information usually presented in a receipt, the receipt also includes a privacy statement or the like indicating that one or more images of the user were captured as part of the transaction process. In this way the user is given notice that their biometric data has been collected.

The present invention is not limited to the provision of only one imaging means. In some embodiments two or more imaging means like imaging means 125 are provided. Advantageously, the two or more imaging means are located in different positions in and/or on the housing of secure data entry device 100, with their respective locations preferably selected such that the chance of at least one imaging means capturing a usable image of a target area of the user during normal use of secure date entry device 100 is maximised. This may be particularly useful for secure data entry devices having multiple payment modes, where one payment mode may tend to cause a user to obscure an area different to that obscured by another payment mode.

Secure data entry device 100 further includes a data processing device 130 (see FIG. 2) such as a microcontroller. This data processing device is separate from and in addition to the normal data processing device(s) (not shown) that are present in known secure data entry devices and which handle the normal, secure operation of such secure data entry devices in the manner known in the art. Such normal data processing devices may be operating to meet a particular security standard such as the PCI-PTS and PCI-PIN standards established in the electronic payment industry. Data processing device 130 is configured to control the operation of the imaging means 125. In particular, data processing device 130 is configured to receive images captured by imaging means 125 and to process those images to extract a biometric pattern (also equivalently referred to in the art as a 'biometric template') from the images in the manner described later in this specification. The data processing device 130 is configured to be triggered by the input means 115 such that a predetermined user input such as pressing of a particular key on the user input means 115 causes the imaging means 125 to capture an image under control of the data processing device 130. This could be achieved through any number of methods that minimises any impact on security compliance of the data entry device 100. For example, by a dedicated unidirectional channel from the input means 115 to data processing device 130 or through intercepting the predetermined input from the channel between the input means 115 and the normal data processing device present in the secure data entry device. As will be apparent to those in the art, the data processing device 130 therefore cannot affect the normal secure operation of the secure data entry device 100.

The processing of images by data processing device 130 may alternatively comprise simply transmitting the images to a remote server for further processing. In this case it is preferred that the images are transmitted over a secure channel, to protect user privacy.

In some embodiments the processing of images additionally includes extracting further information from the images. The extracted further information can include characteristics of the user, e.g. any combination of the age, gender, ethnicity, length of hair, presence of wearable items such as glasses, the user's sentiment, the user's facial symmetry, the general health of the user, etc. Other information known to the skilled person may additionally or alternatively be extracted. The extracted further information can be stored in a database, where it is preferably anonymised and/or encrypted. In some embodiments the extracted further information is associated with a biometric pattern. The extracted further information can represent valuable data for a third party, e.g. a merchant or retailer.

In some embodiments data processing device 130 is integrated with imaging means 125, and in other embodiments data processing device 130 is separate from imaging means 125. Data processing device 130 may be communicatively coupled to network interface 122, to facilitate communication with remote devices such as point of sale terminal 150 and/or remote server 170. Data processing device 130 may comprise a network of data processing devices. The specific infrastructure is subject to many modifications and such modifications are also within the scope of this invention.

The operation of secure data entry device 100 according to an embodiment is described below with reference to FIG. 3.

In step 200, a payment process is initiated. In one embodiment the payment process is initiated by an operator pressing a 'pay' button on a point of sale terminal to transfer control to secure data entry device 100. This causes information relating to the transaction, e.g. the amount due, to be passed from the point of sale terminal to secure data entry device 100 via a communications channel between the two (e.g. a wire or wireless channel), where appropriate information is displayed on display 110 with a message requesting that the user initiate payment using a supported payment mechanism. For example, secure data entry device 100 may display the message "Insert Card" to prompt the user to insert their payment card into slot 120. It will be appreciated that the invention is not limited in this respect as it will be understood by a skilled person that the manner in which the payment process is initiated will vary according to the specifics of a given situation. Thus, many modifications of this are contemplated.

In step 205, secure data entry device 100 requests secure data from the user. This typically involves presenting a text instruction such as "Please Enter Your PIN" to the user on display 110 that the user should follow to provide the secure data. It will be appreciated that the invention is not limited in this respect as it will be understood by a skilled person that the manner in which the user's secure data is requested will vary according to the specifics of a given situation. Thus, many modifications of this are contemplated.

In step 210, the user starts entering the requested secure data. In the case where secure data entry device 100 is a PIN Entry Device, the user begins pressing the appropriate buttons on the keypad to enter their PIN. In the case of a fingerprint, the user moves their finger or thumb to the designated area for fingerprint scanning. Other means for entering the user's secure data will be apparent to a skilled person.

In step 215, a trigger to start image capture is detected. In preferred embodiments, the trigger for imaging means 125 to begin capturing at least one image is a confirmation that secure data entry has been completed. In one embodiment this confirmation takes the form of the user pressing a confirmation button, which in FIG. 1 is labelled 'Enter'. The confirmation button may take many different names, e.g. 'Confirm', 'Accept', 'OK', 'Go', etc., or it may be designated by a specific colour (typically green) or a symbol (typically a circle). As is known in the art, depression of the confirmation button causes secure data entry device 100 to generate a confirmation signal. Data processing device 130 is configured to detect the confirmation signal and to use detection of the confirmation signal as the trigger to initiate image capture.

In another preferred embodiment, the trigger for imaging means 125 to begin capturing at least one image is a confirmation of completion of a payment. This preferred embodiment is particularly suited for 'contactless' payments of the type known in the art, where a payment is effected by bringing a payment instrument equipped with a Near Field Communication (NFC) antenna proximate a NFC reader. In this preferred embodiment, the NFC reader is integrated into secure data entry device 100. As is known in the art, completion of the payment causes secure data entry device 100 to generate a completion signal. In this embodiment, data processing device 130 is configured to detect the completion signal and to use detection of the completion signal as the trigger to initiate image capture. This embodiment may be combined with the embodiment described immediately above, and the resulting combination is also an embodiment of the present invention. This combination is preferred where secure data entry device 100 supports multiple payment modes including a contactless payment mode and a PIN entry mode. It will be appreciated that rather than on detection of the completion signal, the trigger to start image capture could as soon as an indication appears on the display of the secure data entry device 100 to prompt a user to place their payment instrument on the secure data entry device 100. For contactless payments, this can be when NFC antenna is activated for communication and an indication appears on the screen requesting the contactless payment instrument to be brought towards the NFC antenna. Advantageously, this is likely to be the instance when the user is looking towards the imaging means 125.

The invention is however not limited to the above-described triggers, and many modifications will become apparent to the skilled person having the benefit of the present disclosure.

For example, in another embodiment, the trigger for imaging means 125 to begin capturing at least one image is the first interaction that the user has with user input means 115. For example, in the case of PIN entry, the user depressing the first button on the keypad can be used as the trigger to begin image capture.

In yet another embodiment, the trigger for imaging means 125 to begin capturing at least one image is detection of a particular portion of the user, e.g. a finger, hand, face, etc. in the field of view of imaging means 125. In a further embodiment, imaging means 125 waits a predetermined amount of time from the moment at which the user was requested to provide secure data before capturing at least one image. The predetermined amount of time is selected according to the expected time that will elapse between displaying the request for entry of identification information and the user actually starting to enter the secure data. The predetermined time may be in the range of one to ten seconds. However, the invention is not limited in this respect and the predetermined time can of course be modified according to the specifics of a given implementation.

Further modifications are possible. In another embodiment, step 215 begins concurrently with step 205; that is, imaging means 125 does not wait for the user to start entering secure data but instead begins capturing images immediately. In this embodiment, the trigger to start image capture is thus the request for the user to provide identity validation information. In this embodiment it is preferred that imaging means 125 captures more than one image per user identification attempt.

In the case where imaging means 125 captures more than one image per user identification attempt, the image processing may involve comparing the captured images so as to select the most usable image or set of images. The 'usability' of an image may be ranked using one or more factors such as the ability to detect a target area of a user in the image, where the more clearly the target area is depicted in the image, the higher the usability score. Images in which it is not possible to detect the target area of the user may be flagged as unusable, e.g. the flag 'No_Face_Detected' may be assigned to an image in which it was not possible to detect a face.

In the case where a set of images is captured, each image that is deemed usable may be selected and processed to produce a set of biometric patterns. An average biometric pattern may then be generated from this set. Fundamentally, whatever criteria are used, an image that is more likely to provide a good representation of the target area of the user should be ranked as more usable and given a higher usability score than an image that is less likely to be provide a good representation of the target area of a user.

Once the trigger is detected, data processing device 130 causes imaging means 125 to capture at least one image of a target area of the user. Where multiple images are captured, these are preferably captured at a regular, predetermined time interval. This interval should be selected such that a reasonable number of images are captured so as to increase the likelihood of at least one image having a usable image of the user's target feature, but not so many images that the subsequent processing of the images delays the payment process by a significant amount (e.g. several seconds). In one embodiment, the predetermined time interval is in the range of 0.25 seconds to 2 seconds. However, the invention is not limited in this respect and the predetermined time interval can of course be modified according to the specifics of a given implementation.

In embodiments where a plurality of images are captured, it is preferred that a trigger is also provided to stop image capture. In an embodiment, imaging means 125 captures images for a predetermined time period beginning at the moment at which the trigger to start image capture is detected. The predetermined time is preferably chosen such that it is equal to the average time that the target area of the user remains in the vicinity of imaging means 125, and in particular the average time that the target area of the user remains in the field of view of imaging means 125. In some embodiments the predetermined time is in the range of half a second to five seconds. However, the invention is not limited in this respect and the predetermined time can of course be modified according to the specifics of a given implementation. Other triggers for ending image capture can alternatively be used; for example, image capture may end once a predetermined number of images (e.g. ten) have been captured by imaging means 125.

In step 225, secure data entry device 100 checks whether the entered secure data corresponds to the information on record for the payment instrument that has taken part in the transaction. This type of check is well known in the art and hence is not explained in further detail here. This check can be performed concurrently with image capture, or after image capture is complete. In some non-illustrated embodiments, the determination of step 225 is carried out by a remote server rather than by secure data entry device 100.

If the result of the check is positive, i.e. the entered secure data is found to match the corresponding information on record, then in step 230 the payment is authorised in the manner well known in the art.

Following authorisation, in step 235 the one or more images that were captured in step 215 are processed to generate a biometric pattern. This processing may be carried out by secure data entry device 100, e.g. by data processing device 130. Alternatively, secure data entry device 100 may communicate the captured images to its associated point of sale terminal to carry out the processing. The point of sale terminal may include an image processing module configured to carry out the necessary image processing. The image processing is thus carried out locally to the image capture means, i.e. at secure data entry device 100 or at the point of sale terminal, to avoid user image data being transmitted over a public network (e.g. the Internet), for safeguarding user privacy. In other embodiments the one or more captured images are transmitted to a remote server for processing. In these embodiments it is preferred that the one or more captured images are transmitted over a secure channel, e.g. in encrypted form, to safeguard user privacy.

The processing of the captured images involves generating a biometric pattern from the images. It is strongly preferred that the captured images are deleted once they have been processed, preferably immediately after processing is complete. This is in the interests of user privacy. The biometric pattern can be generated according to known algorithms. For example, in the case where the target area is the user's face, the biometric pattern is generated using a facial recognition algorithm. Any currently known facial recognition algorithm, or any developed in the future, can be used. Other suitable algorithms will be selected by the skilled person according to the specifics of a given implementation; for example, a fingerprint recognition algorithm would be used in the case that the target area is the user's finger or thumb.

It is important to appreciate that the biometric pattern is not an image of the user, nor can it be used to reconstruct or otherwise view the images of the user that were used to create the biometric pattern. In this way, user privacy is ensured.

Once the biometric pattern has been generated, in step 240 the biometric pattern is stored in a database. The database is preferably located remotely from secure data entry device 100 and its associated point of sale terminal. In some embodiments supplemental information relating to the captured biometric pattern, such as the date and time of capture of the images from which the biometric pattern was derived, the location at which the images were captured, a transaction identifier, a payment account reference (PAR), information relating to the payment instrument that was used in the transaction (e.g. a PAN), and/or any other available information deemed useful by the skilled person, is also stored in the database. Preferably at least one piece of information is saved that allows the biometric pattern to be associated with at least one of a payment instrument and a user. Sensitive data, e.g. PANs, are preferably stored in the database in encrypted form.

It will be appreciated that step 230 can be carried out before steps 235 and 240, in parallel with steps 235 and 240, or after steps 235 and 240. Embodiments in which step 230 is carried out before or in parallel with steps 235 and 240 are preferred, since these embodiments advantageously avoid delays in the authorisation of the transaction that may otherwise arise due to the time required to process the one or more captured images.

Returning now to step 225, in the event that the entered secure data does not match the corresponding information on record, then the method proceeds to steps 245 and 250. Steps 245 and 250 steps are the same as steps 235 and 240, respectively, and so have not been described in detail again here. One modification is that in step 250, if supplemental information is stored in the database, this information may include a flag that indicates that the biometric pattern is associated with an instance where the entered secure data did not match that on record.

In step 255, a determination is made as to whether the number of tries at entering the required secure data that the user has had is less than the maximum number of attempts allowed. The maximum number of attempts is a predetermined integer that in one embodiment is set at three. The invention is not limited in this respect any positive integer can be chosen for the maximum number of attempts. If the determination of step 255 is positive, the method returns to step 205 and requests that the user re-enter the required secure data. In the determination of step 255 is negative, the method proceeds to step 260 and declines the payment. Optionally, a message is transmitted to a third party such as the issuer of the user's payment instrument, informing the third party of the failure to supply the required secure data. In some embodiments at least one image is captured for each secure data entry attempts. In other embodiments, at least one image is captured for only the first secure data entry attempt, or for only the first N attempts, N being a predetermined integer. Further modifications to this will be apparent to a skilled person having the benefit of the present disclosure.

Figure 3:
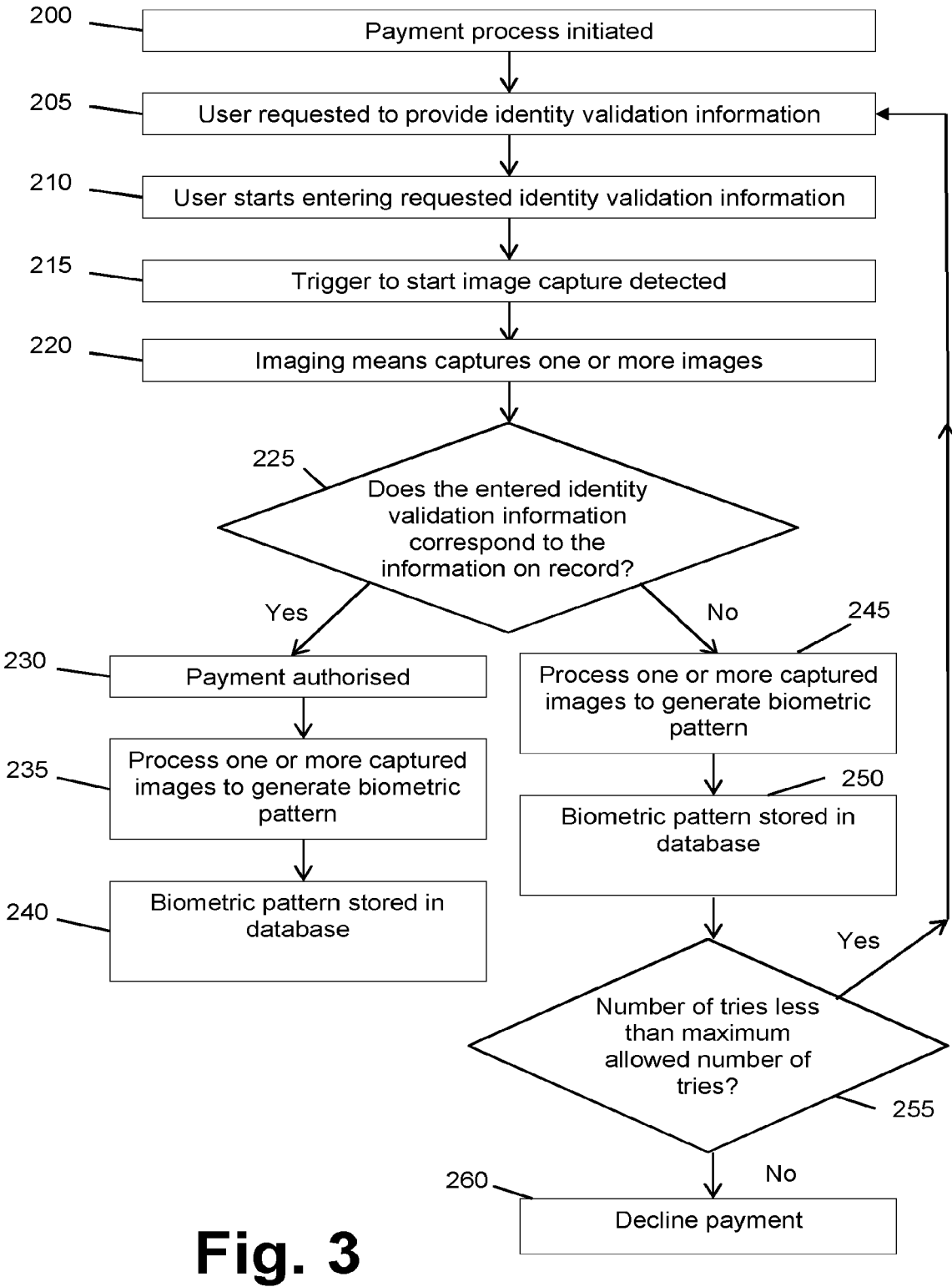
FIG. 3 is a flow diagram showing a first method of using a secure data entry device according to an embodiment.

It is important to note that in the embodiment of FIG. 3 images are captured and processed regardless of the result of identity check 225. This advantageously means that the biometric pattern of a user that is potentially unauthorised is also recorded and stored. This information may be highly valuable to a law enforcement agency should it be subsequently determined that an attempt at fraud was made.

It will be appreciated that step 255 can be carried out in parallel with steps 245 and 250, to advantageously avoid delays in the processing of the transaction that may otherwise arise due to the time required to process the one or more captured images.

In another alternative embodiment, processing of all captured images is deferred until after the payment is authorised or declined, in order to avoid delays that may otherwise arise due to the time required to process the one or more captured images.

The operation of secure data entry device 100 during the payment process according to another embodiment is described below with reference to FIG. 4. Elements of FIG. 4 that have a corresponding element in FIG. 3 share the same suffix, and it will be understood that the description of such elements as set out above in respect of FIG. 3 applies equally to FIG. 4 unless explicitly stated otherwise.

Figure 4:
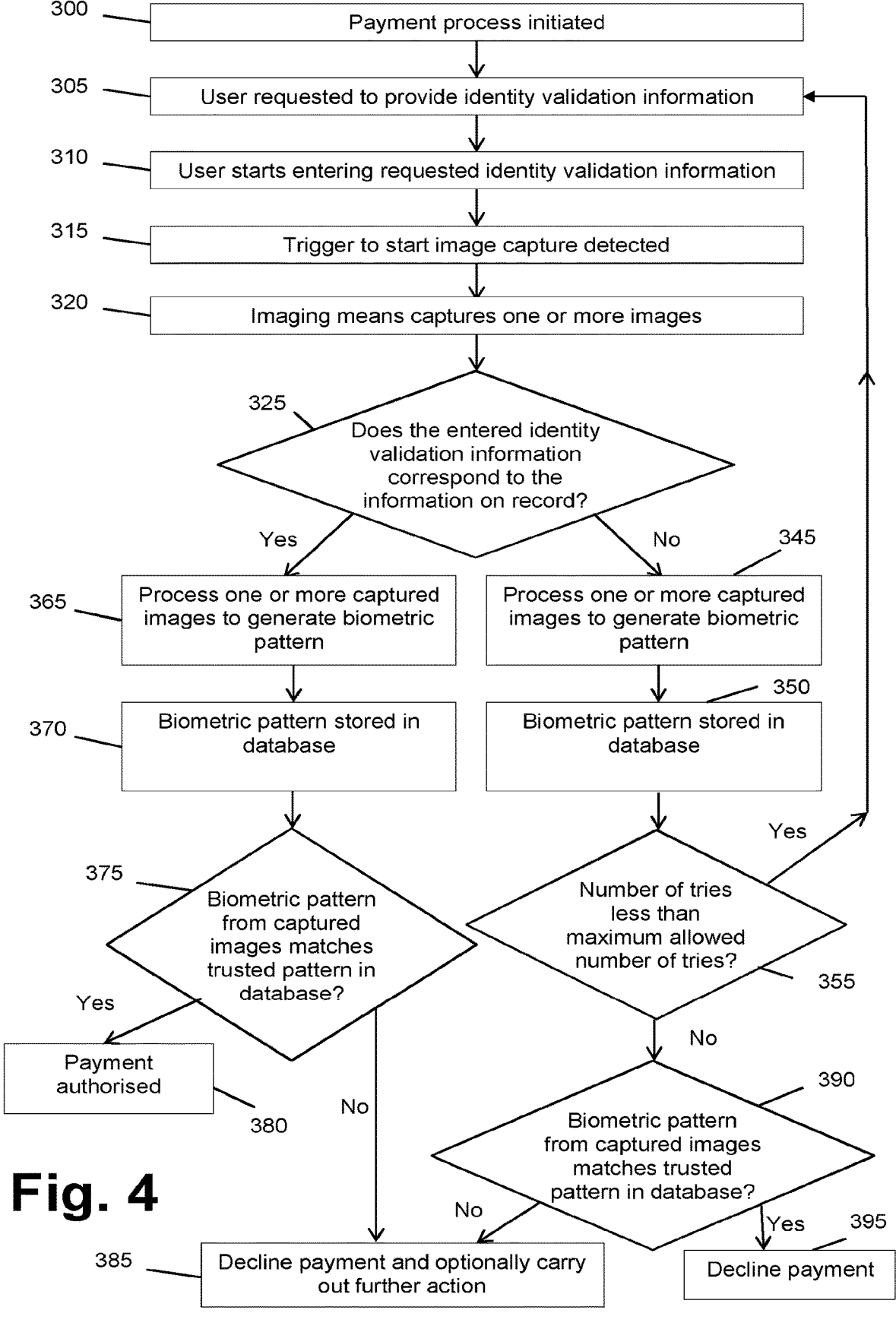
FIG. 4 is a flow diagram showing a second method of using a secure data entry device according to an embodiment.

As can be seen from FIG. 4, this embodiment proceeds in the same manner as the embodiment of FIG. 3 until the result of identity check 325. In this embodiment, if the entered secure data is found to correspond to the information on record, then instead of authorising the transaction the method proceeds to steps 365 and 370 in which the captured images are processed to generate a biometric pattern which is then stored in a database. Steps 365 and 370 are the same as steps 235 and 240 of FIG. 3, respectively. Following this, in step 375 a determination is made as to whether the biometric pattern generated from the captures images matches a trusted biometric pattern stored in the database. The trusted biometric pattern can be generated in a number of ways. The trusted biometric pattern may be generated by remote server 170 and stored in a database that is coupled to remote server 170.

In a preferred embodiment, the trusted biometric pattern is generated by averaging a number of biometric patterns associated with previous use of a given payment instrument. That is, over time the trusted biometric pattern is built up as the authorised user uses their payment instrument, since it is expected that over time the biometric pattern recorded for the user will converge towards a 'true' biometric pattern for that user. The process of FIG. 4 can be used to build up the trusted biometric pattern over time. In this instance the determination of step 375 is preferably only carried out if the database contains a trusted biometric pattern that is based on the average of a sufficient number of individual biometric patterns, such that the confidence level that the trusted biometric pattern is a true representation of the user is high. The determination of a value that is sufficient will be determined without difficulty by a skilled person having the benefit of the present disclosure.

In an alternative embodiment, the user is requested to provide the required biometric data as part of the payment instrument issuance process, so as to generate a trusted biometric pattern that is known with a high confidence level to be associated with the authorised user. The trusted biometric pattern is stored in the database as the 'master' biometric pattern, against which all subsequent biometric patterns associated with that payment instrument are compared. In this embodiment it will be appreciated that it is not necessary to store the biometric pattern generated in step 365 in the database.

One way in which server 170 may generate a trusted biometric pattern is as follows. Server 170 may receive a first biometric pattern from a secure data entry device such as secure data entry device 100 or any variant thereof. The first biometric pattern will be associated with a particular instance of use of an associated payment instrument. Server 170 queries a database containing stored or existing biometric patterns and attempts to identify at least one existing biometric pattern that is stored in the database and which is associated with the payment instrument. If no matching stored biometric pattern can be identified then it is assumed that this is the first instance of usage of the given payment instrument, and the received biometric pattern is stored in the database and associated with the payment instrument.

However, if one or more matching stored biometric patterns are found in the database, then server 170 determines an average of the at least one existing biometric pattern(s) and the first biometric pattern. The average can be determined by any suitable mechanism known to a skilled person. For example, in the case that the biometric pattern is generated by extracting landmarks from a user's face, the averaging may comprise finding the average of individual data points in the biometric pattern; e.g. an average value for eye separation.

After calculating the average biometric pattern, server 170 stores the averaged biometric pattern in the database. Server 170 may determine a confidence level for the averaged biometric pattern and assess whether the determined confidence level is greater than or equal to a threshold confidence level. The nature of and value for the threshold level will be set by a skilled person having the benefit of the present disclosure without difficulty. The threshold level may be set, for example, as a number of individual biometric patterns that must have been averaged over before server 170 is sufficiently confident that the biometric pattern is a true representation of an authorised user. Statistical measures such as standard deviation may be employed. Other ways to set the threshold level will be apparent to a skilled person having the benefit of the present disclosure.

In the event the confidence level assigned to the averaged biometric pattern is found to be greater than or equal to the threshold confidence level, the averaged biometric pattern is flagged by server 170 as a trusted biometric pattern. A trusted biometric pattern is a biometric pattern that is considered sufficiently reliable such that it can be used as part of the transaction validation process. The flagging may involve, for example, setting a 'Trusted_Pattern' flag in the database to 'TRUE'. A trusted biometric pattern may be used as part of the validation process in subsequent transactions involving the payment instrument that is associated with the trusted biometric pattern. In particular, a transaction involving that payment instrument may be authorised only if the biometric pattern supplied as part of the transaction matches the trusted biometric pattern. Alternatively, the transaction may be authorised even if the biometric pattern supplied as part of the transaction does not match the trusted biometric pattern, but in this instance the transaction may be flagged for investigation by an appropriate authority such as a fraud investigation team.

In the event the confidence level assigned to the averaged biometric pattern is found to be less than the threshold confidence level, the above-mentioned process can be repeated until an averaged biometric pattern having a sufficiently high confidence level is obtained.

Another way in which server 170 may generate a trusted biometric pattern is as follows. Server 170 may gather over a time period a predetermined number of biometric patterns that are associated with a single payment instrument so as to form a set of biometric patterns. For example, server 170 may gather ten biometric patterns that are each associated with a single payment instrument, corresponding to ten different transactions performed with that payment instrument. The predetermined number is not limited to ten, and will be readily chosen by a skilled person having the benefit of the present disclosure.

Each biometric pattern in the set can be compared against other transaction-related information that is relevant for assessing the likelihood of the transaction being fraudulent. This transaction-related information can be, for example, a fraud score of the type known in the art, and/or information indicating whether the transaction involved a chargeback element (i.e. transmission of funds from a merchant to the holder of the payment instrument). Other suitable information will be readily identified by a skilled person having the benefit of the present disclosure. It will be appreciated that the transaction-related information is transaction specific and that the transaction-related information can be provided to server 170 along with the biometric pattern. The comparison against other transaction-related information can be performed as each biometric pattern in the set is received by server 170, or alternatively server 170 may accumulate the predetermined number of biometric patterns and then analyse each biometric pattern concurrently.

The results of the aforementioned comparison can be stored in a database to form an example set that is used as training input for an artificial neural network. The artificial neural network may operate under a supervised learning mode, as is known in the art. The artificial neural network is trained using the example set using suitable training method, as will be known to a skilled person. Further comparison results may be added to the example set over time if additional training of the artificial neutral network is required. It will be appreciated that, over time, the artificial neural network will develop the ability to predict what a 'typical' biometric pattern should look like for a given payment instrument. The 'typical' biometric pattern may be thought of as a trusted biometric pattern, as it can be stated with high confidence that the artificial neural network's prediction corresponds to a biometric pattern that is associated with authorised use of the payment instrument.

Once the artificial neural network is sufficiently trained, a subsequent transaction that involves the payment instrument can be analysed by the artificial neural network and flagged up as suspicious if the artificial neural network determines that the biometric data associated with the subsequent transaction does not match the artificial neural network's predicted biometric data (i.e. the trusted biometric data). Here, 'match' should be understood to mean being significantly similar to the predicted biometric pattern as produced by the artificial neural network. A transaction flagged as suspicious could be passed onto an appropriate authority such as a fraud investigation team for further analysis. It will be appreciated that the artificial neural network can be periodically returned to training mode so that it advantageously takes account of changes to the authorised user's biometric pattern.

More generally, an advantage of building up trusted biometric pattern over time during normal transactional use of a payment system is that a user does not need to separately provide biometric information to an appropriate authority (e.g. a payment instrument issuer). Additionally, this process may adapt to a user whose appearance and hence biometric pattern changes over time, keeping the system current.

However the trusted biometric pattern is generated, in the event that a trusted biometric pattern with a sufficiently high confidence level is not found in the database, or no trusted biometric pattern exists at all, the method skips determination 375 and moves directly to step 380 to authorise the payment. In this instance the method is operating as shown in FIG. 3.

In the event that at least one trusted biometric pattern is found in the database, then in step 375 the biometric pattern saved in step 370 is compared to the trusted biometric pattern associated with the payment instrument, or to each trusted biometric pattern associated with the payment instrument if more than one trusted biometric pattern exists. If a match is found, then in step 380 the payment is authorised.

However, if the biometric pattern gathered in step 370 does not match at least one of the trusted patterns, then in step 385 the payment is declined. In another embodiment, if the biometric pattern gathered in step 370 does not match at least one of the trusted patterns, then this result is used to contribute towards a 'fraud score' that is a measure of the likelihood of the transaction being fraudulent. If the fraud score is found to exceed a threshold value, then fraud is deemed likely and the payment is declined. If the fraud score does not exceed the threshold value then the transaction is allowed, although it may also be flagged to an appropriate authority.

Optionally, in the event that the biometric pattern gathered in step 370 does not match at least one of the trusted patterns, a further action may also be taken. The further action may include any combination of: contacting a third party such as the card issuer to flag up the potential fraudulent use of the payment instrument; contacting the payment instrument holder to flag up the potential fraudulent use of the payment instrument; and temporarily disabling the payment instrument. The invention is however not limited in this respect and any other action deemed appropriate to the skilled person upon detection of a potential fraudulent use of a payment instrument can additionally or alternatively be taken in step 385.

It will be appreciated that step 375 advantageously allows the method of FIG. 4 to detect fraudulent transactions where an unauthorised user has obtained the secure data of an authorised user. For example, the method of FIG. 4 can detect a transaction where an unauthorised user has obtained the PIN number of an authorised user. Prior art systems would treat this transaction as genuine and authorise the transaction without question. Advantageously, the second layer of verification introduced by step 375 catches this type of fraudulent use, meaning that fraud is more difficult to perpetrate. Furthermore, since the biometric pattern of the user attempting to make use of the payment instrument is stored in step 370, this pattern could be made available to law enforcement agencies for subsequent investigation.

It will also be appreciated that the biometric information can be used to detect whether chargeback fraud is being committed by an authorised user of the payment instrument. Chargeback is where a payment instrument holder disputes a transaction after is occurs. For example, the payment instrument holder which could be a payment cardholder may deny to a payment card provider or a merchant where the secure data entry device was located that a payment was made by the cardholder. By capturing the image and storing a biometric of the cardholder, further processing can be carried out if the payment is disputed and any false chargebacks can be identified. For example, the same algorithm used to generate the biometric pattern of the cardholder from the image taken by the imaging means in the secure data entry device could be used on another image of the cardholder and if the biometric patterns match, this could be used as evidence of a false chargeback This application could be useful to payment instrument providers and merchants.

Returning now to step 325, in the event that the determination of step 325 is in the negative, the method proceeds to generate a biometric pattern and store this in a database in the manner described in respect of steps 245 and 250. Following this, in step 355 a determination is made as to whether the number of tries at entering the required secure data that the user has had is less than the maximum number of tries allowed in the manner described in respect of step 255.

If the determination of step 355 is positive, then the method returns to step 305 and requests that the user re-enter the required secure data. In the determination of step 355 is negative, the method proceeds to a further determination 390. Here, a determination is made as to whether the biometric pattern generated in step 345 matches the trusted pattern associated with the payment instrument that is stored in the database, or at least one trusted pattern if more than one trusted pattern is stored against the relevant payment instrument. In the negative, the method moves to step 385 in which the payment is declined and optionally a further action may be carried out. The further action may include any combination of: contacting a third party such as the card issuer to flag up the potential fraudulent use of the payment instrument; contacting the payment instrument holder to flag up the potential fraudulent use of the payment instrument; and temporarily disabling the payment instrument. The invention is however not limited in this respect and any other action deemed appropriate to the skilled person upon detection of a potential fraudulent use of a payment instrument can additionally or alternatively be taken in step 385.

If the determination of step 390 is answered in the positive then the method moves to step 395, and the payment is declined. If no trusted pattern with a sufficiently high confidence level exists in the database, or no trusted pattern exists whatsoever, then the method moves straight to step 395 and declines the payment.

It will be apparent to the skilled reader that the embodiment of FIG. 4 is advantageously able to distinguish between an authorised user accidentally mis-entering their secure data and an unauthorised user entering incorrect secure data. This prevents the inconvenience of a payment instrument being temporarily disabled or other such negative consequence due to an authorised user accidentally inputting incorrect data.

It will be appreciated to the skilled reader that determination steps 375 and 390 are independent of one another and that it is therefore not essential to have both determination steps. One or other of determination steps 375 or 390 can be omitted, and the resulting methods are also embodiments of the present invention.

Figure 5:
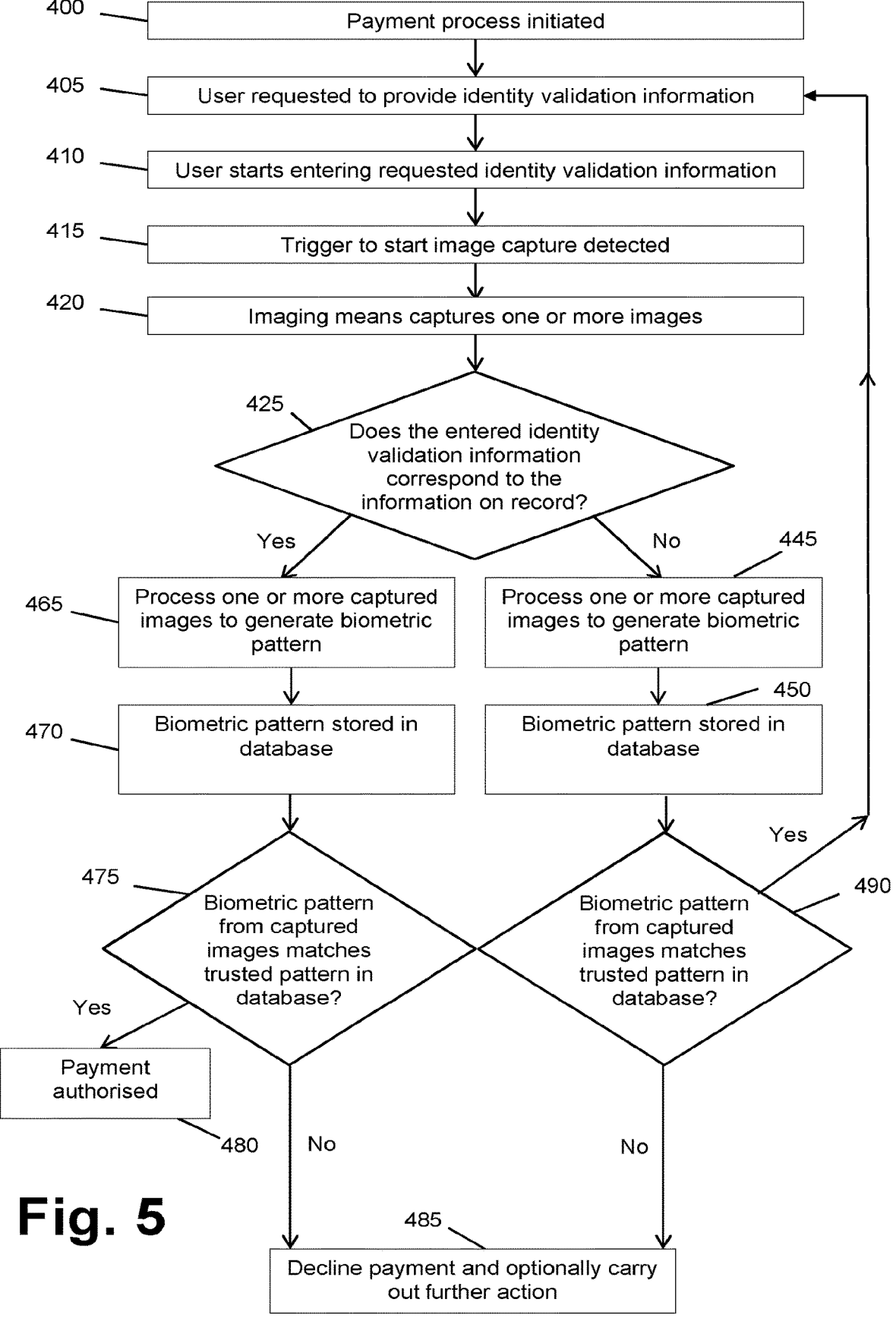
FIG. 5 is a flow diagram showing a third method of using a secure data entry device according to an embodiment.

A further alternative embodiment in which step 355 is omitted is also contemplated. This is shown in FIG. 5. In this embodiment, if the entered secure data does not match the information on record (i.e. the determination of step 425 is negative) then the method moves to step 490 via steps 445 and 450. In step 490, a determination is made as to whether the biometric pattern generated in step 445 matches the trusted pattern associated with the payment instrument that is stored in the database, or at least one trusted pattern if more than one trusted pattern is stored against the relevant payment instrument. In the negative, the method moves to step 485 in which the payment is declined and optionally a further action may be carried out. The further action may include any combination of: contacting a third party such as the card issuer to flag up the potential fraudulent use of the payment instrument; contacting the payment instrument holder to flag up the potential fraudulent use of the payment instrument; and temporarily disabling the payment instrument. The invention is however not limited in this respect and any other action deemed appropriate to the skilled person upon detection of a potential fraudulent use of a payment instrument can additionally or alternatively be taken in step 485.

If the determination of step 490 is answered in the positive then the method returns to step 405, and the user is requested to re-enter their secure data. In this way, the embodiment of FIG. 5 advantageously allows an authorised user to have as many attempts at entering the correct secure data as they require, whereas an unauthorised user is declined after only a single attempt.

It will be appreciated that in all of the above-described embodiments the transaction can be terminated at any point by the user pressing a 'cancel' button on secure data entry device 100 (see FIG. 1).

Numerous modifications, adaptations and variations to the embodiments described herein will become apparent to a person skilled in the art having the benefit of the present disclosure, and such modifications, adaptations and variations are also within the scope of the present invention.

In addition to the embodiments described previously and claimed in the appended claims, the following is a list of additional embodiments, which may serve as the basis for additional claims in this application or subsequent divisional applications.

Embodiment 1: A secure data entry device, comprising: a housing; a display; at least one user input means configured to capture secure data associated with a user; at least one imaging means; a data processing device; at least one payment instrument reading means configured to read a payment instrument; and a network interface; wherein the at least one imaging means is configured to capture at least one image of a user during a transaction involving the payment instrument; and wherein the data processing device is configured to cause the at least one image to be processed to generate a biometric pattern corresponding to the user.

Embodiment 2: The secure data entry device of Embodiment 1, wherein the secure data entry device is a personal identification number entry device and the secure data is a personal identification number.

Embodiment 3: The secure data entry device of Embodiment 2, wherein the at least one user input means is a keypad.

Embodiment 4: The secure data entry device of any one of Embodiments 1 to 3, wherein the data processing device is configured to process the at least one image to generate a biometric pattern corresponding to the user.

Embodiment 5: The secure data entry device of any one of Embodiments 1 to 3, wherein the data processing device is communicatively coupled to the network interface and the data processing device is further configured to transmit the at least one image to a remote server for processing.

Embodiment 6: The secure data entry device of any one of Embodiments 1 to 5, wherein the at least one imaging means is positioned to capture at least one image of one or more of: the user's face, the user's thumb, the user's finger, the user's palm and the user's eye.

Embodiment 7: The secure data entry device of any one of Embodiments 1 to 5, wherein the at least one imaging means is positioned to capture at least one image of the user's face and wherein the data processing device is configured to apply a facial recognition algorithm to the at least one image to generate a biometric pattern corresponding to the user's face.

Embodiment 8: The secure data entry device of any one of Embodiments 1 to 7, wherein the at least one imaging means is a camera.

Embodiment 9: The secure data entry device of any one of Embodiments 1 to 8, wherein the at least one imaging means is a digital camera.

Embodiment 10: The secure data entry device of any one of Embodiments 1 to 9, wherein the secure data entry device is configured to cause the biometric pattern to be stored in a database.

Embodiment 11: The secure data entry device of Embodiment 10, wherein the secure data entry device is configured to cause at least one piece of information associated with the payment instrument that has taken part in the transaction to be stored in the database.

Embodiment 12: The secure data entry device of any one of Embodiments 1 to 11, wherein the data processing device is configured to detect a confirmation signal that is indicative of a user having completed entry of secure data, and wherein the data processing device is further configured to cause the at least one imaging means to begin image capture once the confirmation signal has been detected.

Embodiment 13: The secure data entry device of any one of Embodiments 1 to 12, wherein the data processing device is configured to detect a completion signal that is indicative of a payment having been completed, and wherein the data processing device is further configured to cause the at least one imaging means to begin image capture once the completion signal has been detected.

Embodiment 14: The secure data entry device of any one of Embodiments 1 to 11, wherein the data processing device is configured to cause the at least one imaging means to begin image capture when the user first interacts with the at least one user input means.

Embodiment 15: The secure data entry device of any one of Embodiments 1 to 11, wherein the data processing device is configured to cause the at least one imaging means to begin image capture after a predetermined time interval has elapsed, the beginning of the time interval coinciding with the initiation of the transaction.

Embodiment 16: The secure data entry device of any one of Embodiments 1 to 15, wherein the data processing device is configured to cause the at least one imaging means to stop capturing images after a predetermined number of images have been captured Embodiment 17: The secure data entry device of any one of Embodiments 1 to 15, wherein the data processing device is configured to cause the at least one imaging means to stop capturing images after a predetermined time interval has elapsed, the beginning of the time interval coinciding with the beginning of image capture.

Embodiment 18: The secure data entry device of any one of Embodiments 1 to 17, wherein the at least one imaging means is configured to capture a plurality of images.

Embodiment 19: The secure data entry device of Embodiment 18, wherein capture of adjacent ones of the plurality of images is separated by a predetermined time interval.

Embodiment 20. The secure data entry device of any one of Embodiments 1 to 19, wherein the data processing device is configured to perform a check to determine whether the inputted secure data matches secure data that is stored in a record associated with a payment instrument that has taken part in the transaction, and wherein the secure data entry device is further configured to: in the event the determination is affirmative, cause the transaction to be approved; and in the event the determination is negative, check whether the number of attempts at entering the secure data that the user has had is less than a maximum number of allowed attempts for entering the secure data, wherein the data processing device is further configured to: in the positive, prompt the user to re-enter the secure data; and, in the negative, cause the transaction to be declined.

Embodiment 21: The secure data entry device of any one of Embodiments 1 to 19, wherein the data processing device is configured to perform a check to determine whether the inputted secure data matches secure data that is stored in a record associated with the payment instrument that has taken part in the transaction, and wherein the secure data entry device is further configured to: in the event the determination is affirmative: determine whether the biometric pattern matches a trusted biometric pattern, wherein the secure data entry device is further configured to: in the event the biometric pattern is found to match the trusted biometric pattern, cause the transaction to be authorised; and, in the event the biometric pattern is not found to match the trusted biometric pattern, either: cause the transaction to be declined; or check a fraud score associated with the transaction to determine whether to approve or decline the transaction; and/or in the event the determination is negative: determine whether the biometric pattern matches a trusted biometric pattern, wherein the secure data entry device is further configured to: in the event the biometric pattern is found to match the trusted biometric pattern, cause the transaction to be declined; and, in the event the biometric pattern is not found to match the trusted biometric pattern, cause the transaction to be declined and optionally perform at least one further action.

Embodiment 22: The secure data entry device Embodiment 21, wherein the at least one further action is any combination of: flagging up a potential fraudulent use of the payment instrument to a third party; flagging up a potential fraudulent use of the payment instrument to the payment instrument holder; and temporarily disabling the payment instrument.

Embodiment 23: The secure data entry device of any one of Embodiments 1 to 19, wherein the data processing device is configured to perform a check to determine whether the inputted secure data matches secure data that is stored in a record associated with the payment instrument that has taken part in the transaction, and wherein the secure data entry device is further configured to: in the event the determination is affirmative: determine whether the biometric pattern matches a trusted biometric pattern, wherein the secure data entry device is further configured to: in the event the biometric pattern is found to match the trusted biometric pattern, cause the transaction to be authorised; and, in the event the biometric pattern is not found to match the trusted biometric pattern, cause the transaction to be declined; and/or in the event the determination is negative: determine whether the biometric pattern matches a trusted biometric pattern, wherein the secure data entry device is further configured to: in the event the biometric pattern is found to match the trusted biometric pattern, prompt the user to re-enter the secure data; and, in the event the biometric pattern is not found to match the trusted biometric pattern, cause the transaction to be declined.

Embodiment 24: The secure data entry device of any one of Embodiments 1 to 23, wherein the at least one payment instrument reading means comprises at least one of a Near Field Communication antenna, an integrated circuit reader and a magnetic stripe reader.

Embodiment 25: The secure data entry device of any one of Embodiments 1 to 24, wherein the payment instrument is a payment card or a virtual payment card.

Embodiment 26: A system, comprising: a secure data entry device comprising a housing, a display, at least one user input means configured to capture secure data associated with a user, at least one imaging means, a data processing device, at least one payment instrument reading means configured to read a payment instrument, and a network interface; and a point of sale terminal or unattended self-service machine comprising an image processing module; wherein the at least one imaging means is configured to capture at least one image of a user during a transaction involving the payment instrument; wherein the data processing device is configured to cause the at least one image to be transmitted the point of sale terminal; and wherein the image processing module is configured to receive the at least one image and to process the at least one image to generate a biometric pattern corresponding to the user.

Embodiment 27: The system of Embodiment 26, wherein the secure data entry device is a personal identification number entry device and the secure data is a personal identification number.

Embodiment 28: The system of Embodiment 26, wherein the at least one user input means is a keypad.

Embodiment 29: The system of any one of Embodiments 26 to 28, wherein the at least one imaging means is configured to capture at least one image of one or more of: the user's face, the user's thumb, the user's finger, the user's palm and the user's eye.

Embodiment 30: The system of any one of Embodiments 26 to 28, wherein the at least one imaging means is positioned to capture at least one image of the user's face and wherein the image processing module is configured to apply a facial recognition algorithm to the at least one image to generate a biometric pattern corresponding to the user's face.

Embodiment 31: The system of any one of Embodiments 26 to 30, wherein the at least one imaging means is a camera.

Embodiment 32: The system of any one of Embodiments 26 to 31, wherein the at least one imaging means is a digital camera.

Embodiment 33: The system of any one of Embodiments 26 to 32, wherein the point of sale terminal is configured to cause the biometric pattern to be stored in a database.

Embodiment 34: The system of Embodiment 33, wherein the point of sale terminal or unattended self-service machine is configured to cause at least one piece of information associated with the payment instrument that has taken part in the transaction to be stored in the database.

Embodiment 35: The system of any one of Embodiments 26 to 34, wherein the data processing device is configured to detect a confirmation signal that is indicative of a user having completed entry of secure data, and wherein the data processing device is further configured to cause the at least one imaging means to begin image capture once the confirmation signal has been detected.

Embodiment 36: The system of any one of Embodiments 26 to 34, wherein the data processing device is configured to detect a completion signal that is indicative of a payment having been completed, and wherein the data processing device is further configured to cause the at least one imaging means to begin image capture once the completion signal has been detected.

Embodiment 37: The system of any one of Embodiments 26 to 34, wherein the data processing device is configured to cause the at least one imaging means to begin image capture when the user first interacts with the at least one user input means.

Embodiment 38: The system of any one of Embodiments 26 to 34, wherein the data processing device is configured to cause the at least one imaging means to begin image capture after a predetermined time interval has elapsed, the beginning of the predetermined time interval coinciding with the initiation of the transaction.

Embodiment 39: The system of any one of Embodiments 26 to 38, wherein the data processing device is configured to cause the at least one imaging means to stop capturing images after a predetermined number of images have been captured.

Embodiment 40: The system of any one of Embodiments 26 to 38, wherein the data processing device is configured to cause the at least one imaging means to stop capturing images after a predetermined time interval has elapsed, the beginning of the predetermined time interval coinciding with the beginning of image capture.

Embodiment 41: The system of any one of Embodiments 26 to 40, wherein the at least one imaging means is configured to capture a plurality of images.

Embodiment 42: The system of Embodiment 41, wherein capture of adjacent ones of the plurality of images is separated by a predetermined time interval.

Embodiment 43: The system of any one of Embodiments 26 to 42, wherein the system is configured to perform a check to determine whether the inputted secure data matches secure data that is stored in a record associated with the payment instrument that has taken part in the transaction, and wherein the system is further configured to: in the event the determination is affirmative, cause the transaction to be approved; and in the event the determination is negative, check whether the number of attempts at entering the secure data that the user has had is less than a maximum number of allowed attempts for entering the secure data, wherein the system is further configured to: in the positive, prompt the user to re-enter the secure data; and, in the negative, cause the transaction to be declined.

Embodiment 44: The system of any one of Embodiments 26 to 42, wherein the system is configured to perform a check to determine whether the inputted secure data matches secure data that is stored in a record associated with the payment instrument that has taken part in the transaction, and wherein the system is further configured to: in the event the determination is affirmative: determine whether the biometric pattern matches a trusted biometric pattern, wherein the system is further configured to: in the event the biometric pattern is found to match the trusted biometric pattern, cause the transaction to be authorised; and, in the event the biometric pattern is not found to match the trusted biometric pattern, either: cause the transaction to be declined; or check a fraud score associated with the transaction to determine whether to approve or decline the transaction; and/or in the event the determination is negative:

determine whether the biometric pattern matches a trusted biometric pattern, wherein the system is further configured to: in the event the biometric pattern is found to match the trusted biometric pattern, cause the transaction to be declined; and, in the event the biometric pattern is not found to match the trusted biometric pattern, cause the transaction to be declined and optionally perform at least one further action.

Embodiment 45: The system of Embodiment 44, wherein the at least one further action is any combination of: flagging up a potential fraudulent use of the payment instrument to a third party; flagging up a potential fraudulent use of the payment instrument to the payment instrument holder; and temporarily disabling the payment instrument.

Embodiment 46: The system of any one of Embodiments 26 to 42, wherein the system is configured to perform a check to determine whether the inputted secure data matches secure data that is stored in a record associated with the payment instrument that has taken part in the transaction, and wherein the system is further configured to: in the event the determination is affirmative: determine whether the biometric pattern matches a trusted biometric pattern, wherein the system is further configured to: in the event the biometric pattern is found to match the trusted biometric pattern, cause the transaction to be authorised; and, in the event the biometric pattern is not found to match the trusted biometric pattern, cause the transaction to be declined; and/or in the event the determination is negative: determine whether the biometric pattern matches a trusted biometric pattern, wherein the system is further configured to: in the event the biometric pattern is found to match the trusted biometric pattern, prompt the user to re-enter the secure data; and, in the event the biometric pattern is not found to match the trusted biometric pattern, cause the transaction to be declined.

Embodiment 47: The system of any one of Embodiments 26 to 46, wherein the at least one payment instrument reading means comprises at least one of a Near Field Communication antenna, an integrated circuit reader and a magnetic stripe reader.

Embodiment 48: The system of any one of Embodiments 26 to 47, wherein the payment instrument is one of a payment card and a virtual payment card.

Embodiment 49: A method, comprising: initiating a payment transaction, the payment transaction involving a payment instrument; capturing, using an imaging means, at least one image of a user during the payment transaction, the imaging means being part of a secure data entry device; processing the at least one image to generate a biometric pattern; and storing the biometric pattern in a database.

Embodiment 50: The method of Embodiment 49, further comprising: determining whether the biometric pattern matches a trusted biometric pattern; and wherein the method further comprises: authorising the transaction if the result of the determining is positive, and/or declining the transaction if the result of the determining is negative.

Embodiment 51: The method of Embodiment 49, further comprising: determining whether the biometric pattern matches a trusted biometric pattern; and wherein the method further comprises: authorising the transaction if the result of the determining is positive, and/or checking a fraud score associated with the transaction to determine whether to approve or decline the transaction if the result of the determining is negative.

Embodiment 52: The method of Embodiment 50 or 51 wherein, if the transaction is declined, the method further comprises at least one of: flagging up a potential fraudulent use of the payment instrument to a third party; flagging up a potential fraudulent use of the payment instrument to the payment instrument holder; and temporarily disabling the payment instrument.

Embodiment 53: The method of any one of Embodiments 49 to 52, further comprising: requesting secure data from the user; receiving secure data from the user via a user input means; and determining whether the received secure data matches secure data associated with the payment instrument.

Embodiment 54: The method of Embodiment 53, wherein the capturing is triggered by a confirmation signal, the confirmation signal being indicative of a user having completed entry of secure data.

Embodiment 55: The method of Embodiment 53, wherein the capturing is triggered by a completion signal, the completion signal being indicative of a payment having been completed.

Embodiment 56: The method of any one of Embodiments 49 to 55, wherein the capturing begins after a predetermined time interval has elapsed, the predetermined time interval beginning at the initiating.

Embodiment 57: The method of Embodiment 53, wherein the capturing begins substantially concurrently with the beginning of the requesting.

Embodiment 58: The method of Embodiment 53, wherein the capturing begins substantially concurrently with the beginning of the receiving.

Embodiment 59: The method of any one of Embodiments 49 to 58, wherein the capturing continues for a predetermined time interval.

Embodiment 60: The method of any one of Embodiments 49 to 58, wherein the capturing continues until a predetermined number of images have been captured.

Embodiment 61: The method of any one of Embodiments 49 to 60, wherein the at least one image include the user's face, and wherein the processing comprises applying a facial recognition algorithm to the at least one image.

Embodiment 62: The method of any one of Embodiments 49 to 60, wherein the at least one image includes of one or more of: the user's face, the user's thumb, the user's finger, the user's palm and the user's eye.

Embodiment 63: The method of any one of Embodiments 49 to 62, further comprising: storing, in the database, at least one piece of information associated with the payment instrument that has taken part in the transaction.

Embodiment 64: The method of any one of Embodiments 49 to 63, wherein the capturing comprises capturing a plurality of images.

Embodiment 65: The method of any one of Embodiments 49 to 64, wherein the imaging means is a digital camera.

Embodiment 66: The method of any one of Embodiments 49 to 65, wherein the payment instrument is one of a payment card or a virtual payment card.

Embodiment 67: The method of any one of Embodiments 49 to 66, wherein the secure data entry device is a secure data entry device as defined in any one of Embodiments 1 to 25.

The invention claimed is:

1. A method of executing electronic transactions, the method comprising:
   receiving, by a secure data entry system, a request to execute an electronic transaction;
   capturing, by an imaging device coupled to the secure data entry system, a plurality of images, wherein the plurality of images include target areas of a user initiating the electronic transaction;
   processing, by a processing device of the secure data entry system, the plurality of images to extract additional information associated with the user, wherein the extracted additional information is stored in a database in an anonymized and/or encrypted format;
   assigning, by the processing device of the secure data entry system, a usability score to each image of the plurality of images, wherein an image with a more clearly depicted target area of the user is assigned a higher usability score;
   generating, by the processing device of the secure data entry system, a ranking based on the usability score of each image by comparing a first image of the plurality of images with a second image of the plurality of images;
   selecting, by the processing device of the secure data entry system, at least one image from the plurality of images based, at least in part, on the ranking of the usability score of each image;
   generating, by the processing device of the secure data entry system, a biometric pattern corresponding to the captured target area of the user by processing the at least one selected image, wherein the biometric pattern is generated using a facial recognition algorithm or fingerprint recognition algorithm;
   generating, by the processing device of the secure data entry system, a trusted biometric pattern by averaging a plurality of biometric patterns associated with previous use of a payment instrument of the user, wherein averaging the plurality of biometric patterns include calculating an average of corresponding data points of the plurality of biometric patterns;
   comparing, by the processing device of the secure data entry system, the generated biometric pattern to the trusted biometric pattern; and
   executing, by the processing device of the secure data entry system, the electronic transaction based on a result of a comparison between the biometric pattern and the trusted biometric pattern.

2. The method of claim 1, wherein the target area of the user is at least one of a face, a digit, a palm, or an eye of the user.

3. The method of claim 1, wherein executing the electronic transaction further comprises:
   determining, by the processing device of the secure data entry system, the biometric pattern matches the trusted biometric pattern to authorize the electronic transaction.

4. The method of claim 1, further comprising:
   detecting, by the secure data entry system, via the imaging device, a portion of the user in a field of view of the imaging device.

5. The method of claim 4, wherein initiating of the image capture is triggered upon detecting the portion of the user in the field of view of the imaging device.

6. The method of claim 1, wherein the electronic transaction is an electronic payment transaction.

7. The method of claim 1, further comprising:

collecting one or more biometric patterns associated with the payment instrument over a predetermined period time period to form a set of biometric patterns;

comparing each biometric pattern from the set of biometric patterns with transaction-related information for assessing a likelihood of fraud, wherein the transaction-related information include a fraud score; and training, by the secure data entry system, an artificial neural network to predict the trusted biometric pattern associated with the use of the payment instrument based on the result of the comparison.

8. The method of claim 7, further comprising:

analyzing, by the trained artificial neural network, biometric data associated with a subsequent electronic transaction involving the payment instrument; and determining, by the trained artificial neural network, the biometric data does not match the trusted biometric pattern, wherein the biometric data is labelled as suspicious.

9. A secure data entry system comprising:

one or more computer readable media storing instructions for executing electronic transactions; and one or more processors configured to execute the instructions, wherein execution of the instructions by the one or more processors causes the secure data entry system to perform operations comprising:

receiving, by the secure data entry system, a request to execute an electronic transaction;

capturing, by an imaging device coupled to the secure data entry system, a plurality of images, wherein the plurality of images include target areas of a user initiating the electronic transaction;

processing, by a processing device of the secure data entry system, the plurality of images to extract additional information associated with the user, wherein the extracted additional information is stored in a database in an anonymized and/or encrypted format;

assigning, by the processing device of the secure data entry system, a usability score to each image of the plurality of images, wherein an image with a more clearly depicted target area of the user is assigned a higher usability score;

generating, by the processing device of the secure data entry system, a ranking based on the usability score of each image by comparing a first image of the plurality of images with a second image of the plurality of images;

selecting, by the processing device of the secure data entry system, at least one image from the plurality of images based, at least in part, on the ranking of the usability score of each image;

generating, by the processing device of the secure data entry system, a biometric pattern corresponding to the captured target area of the user by processing the at least one selected image, wherein the biometric pattern is generated using a facial recognition algorithm or fingerprint recognition algorithm;

generating, by the processing device of the secure data entry system, a trusted biometric pattern by averaging a plurality of biometric patterns associated with previous use of a payment instrument of the user, wherein averaging the plurality of biometric patterns include calculating an average of corresponding data points of the plurality of biometric patterns;

comparing, by the processing device of the secure data entry system, the generated biometric pattern to the trusted biometric pattern; and executing, by the processing device of the secure data entry system, the electronic transaction based on a result of a comparison between the biometric pattern and the trusted biometric pattern.

10. The system of claim 9, wherein the target area of the user is at least one of a face, a digit, a palm, or an eye of the user.

11. The system of claim 9, wherein executing the electronic transaction further comprises:

determining, by the processing device of the secure data entry system, the biometric pattern matches the trusted biometric pattern to authorize the electronic transaction.

12. The system of claim 9, the operations further comprising:

detecting, by the secure data entry system, via the imaging device, a portion of the user in a field of view of the imaging device.

13. The system of claim 12, wherein initiating of the image capture is triggered upon detecting the portion of the user in the field of view of the imaging device.

14. The system of claim 9, the operations further comprising:

collecting one or more biometric patterns associated with the payment instrument over a predetermined period time period to form a set of biometric patterns;

comparing each biometric pattern from the set of biometric patterns with transaction-related information for assessing a likelihood of fraud, wherein the transaction-related information include a fraud score; and training, by the secure data entry system, an artificial neural network to predict the trusted biometric pattern associated with the use of the payment instrument based on the result of the comparison.

15. The system of claim 14, the operations further comprising:

analyzing, by the trained artificial neural network, biometric data associated with a subsequent electronic transaction involving the payment instrument; and determining, by the trained artificial neural network, the biometric data does not match the trusted biometric pattern, wherein the biometric data is labelled as suspicious.

16. A non-transitory computer-readable medium storing instructions for executing electronic transactions, the instructions, when executed by one or more processors causes a secure data entry system to perform operations comprising:

receiving, by the secure data entry system, a request to execute an electronic transaction;

capturing, by an imaging device coupled to the secure data entry system, a plurality of images, wherein the plurality of images include target areas of a user initiating the electronic transaction;

processing, by a processing device of the secure data entry system, the plurality of images to extract additional information associated with the user, wherein the extracted additional information is stored in a database in an anonymized and/or encrypted format;

assigning, by the processing device of the secure data entry system, a usability score to each image of the plurality of images, wherein an image with a more clearly depicted target area of the user is assigned a higher usability score;

generating, by the processing device of the secure data entry system, a ranking based on the usability score of each image by comparing a first image of the plurality of images with a second image of the plurality of images;

selecting, by the processing device of the secure data entry system, at least one image from the plurality of images based, at least in part, on the ranking of the usability score of each image;

generating, by the processing device of the secure data entry system, a biometric pattern corresponding to the captured target area of the user by processing the at least one selected image, wherein the biometric pattern is generated using a facial recognition algorithm or fingerprint recognition algorithm;

generating, by the processing device of the secure data entry system, a trusted biometric pattern by averaging a plurality of biometric patterns associated with previous use of a payment instrument of the user, wherein averaging the plurality of biometric patterns include calculating an average of corresponding data points of the plurality of biometric patterns;

comparing, by the processing device of the secure data entry system, the generated biometric pattern to the trusted biometric pattern; and executing, by the processing device of the secure data entry system, the electronic transaction based on a result of a comparison between the biometric pattern and the trusted biometric pattern.

17. The non-transitory computer-readable medium of claim 16, wherein the target area of the user is at least one of a face, a digit, a palm, or an eye of the user.

18. The non-transitory computer-readable medium of claim 16, wherein executing the electronic transaction further comprises:

determining, by the processing device of the secure data entry system, the biometric pattern matches the trusted biometric pattern to authorize the electronic transaction.

19. The non-transitory computer-readable medium of claim 18, the operations further comprising:

detecting, by the secure data entry system, via the imaging device, a portion of the user in a field of view of the imaging device, wherein initiating of the image capture is triggered upon detecting the portion of the user in the field of view of the imaging device.

20. The non-transitory computer-readable medium of claim 16, the operations further comprising:

collecting one or more biometric patterns associated with the payment instrument over a predetermined period time period to form a set of biometric patterns;

comparing each biometric pattern from the set of biometric patterns with transaction-related information for assessing a likelihood of fraud, wherein the transaction-related information include a fraud score;

training, by the secure data entry system, an artificial neural network to predict the trusted biometric pattern associated with the use of the payment instrument based on the result of the comparison;

analyzing, by the trained artificial neural network, biometric data associated with a subsequent electronic transaction involving the payment instrument; and determining, by the trained artificial neural network, the biometric data does not match the trusted biometric pattern, wherein the biometric data is labelled as suspicious.

* * * * *